(12) United States Patent
Pandit

(10) Patent No.: US 9,025,451 B2
(45) Date of Patent: May 5, 2015

(54) POSITIVE FEEDBACK ETHERNET LINK FLOW CONTROL FOR PROMOTING LOSSLESS ETHERNET

(71) Applicant: Emulex Design and Manufacturing Corp., Costa Mesa, TX (US)

(72) Inventor: Parav Kanaiyalal Pandit, Banglore (IN)

(73) Assignee: Emulex Corporation, Costa Mesa, CA (US)

(*) Notice: Subject to any disclaimer, the term of this patent is extended or adjusted under 35 U.S.C. 154(b) by 135 days.

(21) Appl. No.: 13/746,931

(22) Filed: Jan. 22, 2013

(65) Prior Publication Data
US 2014/0204742 A1   Jul. 24, 2014

(51) Int. Cl.
H04L 12/26   (2006.01)
H04L 12/825  (2013.01)

(52) U.S. Cl.
CPC ................... H04L 47/263 (2013.01)

(58) Field of Classification Search
CPC ............. H04L 47/263; H04L 12/4604; H04L 2012/5617; H04L 47/24; H04L 47/805
USPC ............... 370/231, 395.21, 395.53, 338, 470, 370/471, 476, 236
See application file for complete search history.

(56) References Cited

U.S. PATENT DOCUMENTS

| | | | |
|---|---|---|---|
| 6,044,406 A * | 3/2000 | Barkey et al. | 709/235 |
| 6,618,354 B1 * | 9/2003 | Sharma | 370/229 |
| 6,925,094 B2 * | 8/2005 | Sharony et al. | 370/468 |
| 8,553,710 B1 * | 10/2013 | White et al. | 370/429 |
| 2008/0056300 A1 * | 3/2008 | Williams | 370/466 |
| 2009/0292575 A1 * | 11/2009 | Ellebracht et al. | 705/8 |
| 2013/0016609 A1 * | 1/2013 | Hayakawa et al. | 370/230 |
| 2014/0169169 A1 * | 6/2014 | Almog et al. | 370/235 |

OTHER PUBLICATIONS

"Converged Networks with Fibre Channel over Ethernet and Data Center Bridging." Technology brief, 2nd edition. Downloaded Nov. 24, 2012 from http://bizsupport2.austin.hp.com/bc/docs/support/SupportManual/c02664786/c02664786.pdf; Hewlett-Packard, TC101220TB, Dec. 2010. pp. 1-20.

"Converged Networks with Fibre Channel over Ethernet and Data Center Bridging." Technology brief, 2nd edition. Downloaded Nov. 24, 2012 from http://bizsupport2.austin.hp.com/bc/docs/support/supportmanual/c02664786/c02664786.pdf Hewlett-Packard, TC101220TB, Dec. 2010.

* cited by examiner

*Primary Examiner* — Brian D Nguyen
(74) *Attorney, Agent, or Firm* — McAndrews, Held & Malloy, Ltd.

(57) ABSTRACT

An Ethernet node includes a receiver and transmitter for coupling to an Ethernet link for transceiving Ethernet frames with a remote Ethernet node at a remote end of the Ethernet link. The Ethernet node sends to the remote Ethernet node credit information that enables the remote Ethernet node to know an amount of Ethernet frames the remote Ethernet node is allowed to send to the Ethernet node. The credit information may be specified on a VLAN priority basis and may be included in a header piggy-backed on a host Ethernet frame or may be included in an explicit frame. The credit information may incrementally replenish credits or may specify an absolute credit amount and may be sent in response to processing frames, detection of a frame error, receipt of a request from the remote node or other events.

14 Claims, 4 Drawing Sheets

POSITIVE FEEDBACK ETHERNET LINK FLOW CONTROL FOR PROMOTING LOSSLESS ETHERNET

BACKGROUND

Unlike other link layer protocols, such as Fibre Channel or Infiniband, the Ethernet link layer protocol did not originally provide a link layer flow control mechanism. Consequently, if the Ethernet node at one end of the link sent a frame for which the node at the other end of the link did not have a free buffer to receive the frame, the receiving node would simply drop the frame, or packet. Furthermore, when this occurs, there is no mechanism at the link layer for the node to notify the remote node that it dropped the frame. Typically in this case, an upper level protocol detects that it did not receive a frame it was expecting (the dropped frame) within a timeout period and requests retransmission of the frame. The upper layer timeout and retransmission request error recovery solution is undesirable. First, significant latency (e.g., the timeout period) may be introduced. Second, the timeout detection and retransmission may involve the host software in the server leading to reduced CPU utilization for the application workload. Third, even if an offload engine handles the retransmission, power consumption and complexity of the network adapter may be increased.

To address this problem, a flow control solution was devised in which a receiving Ethernet node is enabled to send a frame to the sending node instructing the sending node not to send any more frames for at least a time quanta specified in the frame. This frame is referred to as a PAUSE frame and is defined by the IEEE 802.3x standard. A PAUSE frame may also be sent to restart the flow before the time quantum expires.

However, a problem subsequently emerged with the PAUSE frame solution. Different flows of data over an Ethernet link may specify different classes of service, as defined by the IEEE 802.1p standard. A PAUSE frame stops transmission on the link for all classes of service. This is particularly problematic for data center bridging installations that employ higher-level protocols—such as Fibre Channel over Ethernet (FCoE) and others, such as used in clustered High Performance Computing (HPC) applications—that require lossless behavior. The data center bridging often uses the same Ethernet links to transmit the FCoE (and other lossless-requiring protocol) frames along with frames of other protocols having different classes of service that may not require lossless transmission, such as real-time audio or video data, but which may require high performance that is stifled by the lossless PAUSE frame flow control mechanism.

To solve this problem, an enhancement was added to allow the pausing and time quanta to be specified individually for each of eight different priority classes. The modified PAUSE frame is referred to as a Per Priority Pause (PPP) frame or Priority Flow Control (PFC), and is defined in the IEEE 802.1Qbb standard.

The above Ethernet link layer flow control approaches may be characterized as negative feedback flow control solutions because the receiving node notifies the sending node to stop sending frames in the event of its inability to receive incoming frames. However, it has been observed that the negative feedback flow control scheme may not provide lossless behavior as desired. According to the conventional Ethernet protocol, if the receiving node detects a frame error (e.g., a CRC error), it does not notify the sending node of the error, but instead simply drops the erroneous frame. If the dropped frame is a PPP/PFC frame for a given service class, the sending node will not know that it is supposed to stop sending frames for that service class, which may result in a buffer overflow and dropped frame for the service class, resulting in a failure to provide lossless behavior. Therefore, an improved Ethernet link layer flow control solution is needed.

BRIEF SUMMARY

To address the problems described above, a positive feedback credit-based Ethernet link flow control solution is provided.

In one aspect, embodiments provide an Ethernet node. The Ethernet node includes a receiver for coupling to an Ethernet link for receiving Ethernet frames from a remote Ethernet node at a remote end of the Ethernet link. The Ethernet node also includes a transmitter for coupling to the Ethernet link for sending Ethernet frames to the remote Ethernet node on the Ethernet link. The Ethernet node is configured to send to the remote Ethernet node credit information that enables the remote Ethernet node to know an amount of Ethernet frames the remote Ethernet node is allowed to send to the Ethernet node.

In another aspect, embodiments provide a method for controlling the flow of Ethernet frames on an Ethernet link that couples first and second Ethernet nodes. The method includes the first Ethernet node sending to the second Ethernet node credit information that enables the second Ethernet node to know a first amount of Ethernet frames the second Ethernet node is allowed to send to the first Ethernet node. The method also includes the first Ethernet node receiving from the second Ethernet node second credit information that enables the first Ethernet node to know a second amount of Ethernet frames the first Ethernet node is allowed to send to the second Ethernet node.

In yet another aspect, embodiments provide a computer program product encoded in at least one non-transitory computer readable medium for use with a computing device, the computer program product comprising computer readable program code embodied in said medium. The computer readable program code includes first program code for sending, by a first Ethernet node linked to a second Ethernet node, to the second Ethernet node credit information that enables the second Ethernet node to know a first amount of Ethernet frames the second Ethernet node is allowed to send to the first Ethernet node. The computer readable program code also includes second program code for receiving, by the first Ethernet node, from the second Ethernet node second credit information that enables the first Ethernet node to know a second amount of Ethernet frames the first Ethernet node is allowed to send to the second Ethernet node.

DETAILED DESCRIPTION OF THE EMBODIMENTS

Figure 1:
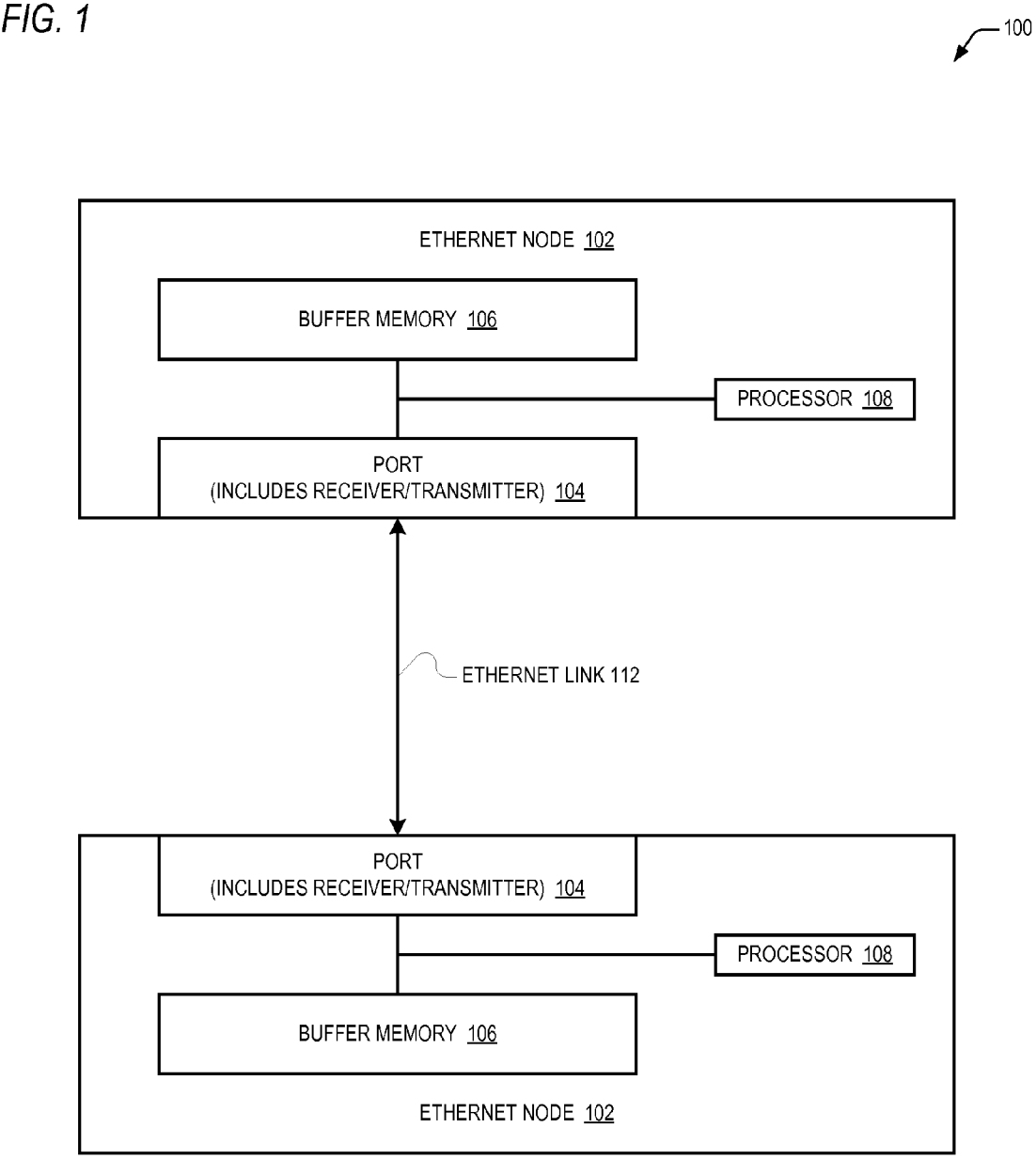
FIG. 1 is a block diagram illustrating a network that includes Ethernet nodes configured to perform a positive feedback credit-based Ethernet link flow control mechanism.

To address the problems described above, disclosed are embodiments of a positive feedback control system for controlling the flow of Ethernet frames on an Ethernet link between two Ethernet nodes. According to the positive feedback flow control approach, the near node sends the remote node credit information that enables the remote node to know an amount of frames the remote node is allowed to send to the near node. That is, the remote node is only allowed to send as many frames as it has been positively authorized by the near node to send. The near node continuously sends the credit information to the remote node to continuously replenish the remote node's credits. This positive feedback approach is in contrast to the negative feedback approach employed by the PAUSE or PPP/PFC scheme in which the remote node is allowed to send as many frames as it wants unless and until it receives from the near node a notification to stop sending frames (on a per priority basis). Consequently, the positive feedback flow control approach, unlike the negative feedback approach, tolerates of the loss of a frame that includes the credit information (e.g., if the remote node discards the frame with the credit information because it has a checksum error) and still avoids buffer overflow frame loss. This is because if the remote node loses the frame that includes the credit information, the effect is for the remote node to tend toward reducing and potentially ceasing transmission of frames, which prevents buffer overflow frame loss. In contrast, if the remote node loses the PAUSE or PPP/PFC frame, the effect is for the remote node to tend toward continued transmission, which sustains and potentially increases the likelihood of buffer overflow and further frame loss, as discussed above.

Embodiments are described in which the near node sends the remote node credit information specific to one or more virtual local area network (VLAN) priorities. This facilitates on Ethernet links lossless behavior for higher level protocols that require lossless behavior (e.g., FCoE) mixed with lossy behavior for higher level protocols that tolerate some amount of lossy behavior, e.g., real-time audio or video data.

Generally, the near node sends the remote node the credit information as buffer space becomes available in the near node. Additionally, embodiments are described in which the remote node may proactively request credit information to which the near node responds with the credit information. This provides a mechanism for increasing the frame transmission rate or even restarting frame transmission in the event the previously sent frame containing the credit information was lost. Examples of events that may prompt the remote node to request the credit information, among others, are the remote node receiving a frame with an error (which could have included the credit information) and the remote node detecting that its buffers for receiving frames from the near node have reached a low water mark.

Referring now to FIG. 1, a block diagram illustrating a network 100 that includes Ethernet nodes 102 configured to perform a positive feedback credit-based Ethernet link flow control mechanism is shown. The network 100 includes a pair of Ethernet nodes 102 in communication via an Ethernet link 112. Although only two Ethernet nodes 102 are shown, the mechanism described may be employed in any network having one or more Ethernet node pairs such as the one shown. The Ethernet nodes 102 may be end nodes or non-end nodes such as within servers, storage devices, networking nodes, switches and routers.

Each of the Ethernet nodes 102 includes a processor 108, a buffer memory 106, and a port 104 that includes a receiver and transmitter. The buffer memory 106 is used to buffer Ethernet frames received from the Ethernet link 112 by the port 104 receiver that were transmitted by the Ethernet node 102 at the other end of the link 112, that is, the partner node 102. The buffer memory 106 is also used to buffer Ethernet frames transmitted on the Ethernet link 112 by the port 104 transmitter to the partner node 102. Preferably, the processor 108 manages the allocation and de-allocation of frame buffer space within the buffer memory 106, although in other embodiments hardware state machines primarily perform the frame buffer management in cooperation with the processor 108. The Ethernet frames may also be referred to herein as packets. Although the Ethernet nodes 102 are shown in FIG. 1 with a single port 104, it should be understood that the Ethernet nodes 102 can include multiple ports 104 and may be Ethernet switches, routers, network interface adapters or any device that includes an Ethernet port for linking to a remote Ethernet port. Furthermore, it should be understood that the Ethernet node 102 may not include the buffer memory 106, such as, for example, some embodiments of an Ethernet switch node 102 that implement a pass-through or cut-through switching mechanism rather than a buffered or store-and-forward switching mechanism.

In one embodiment, the transmitter portion of each node 102 on the link 112 maintains, for each VLAN priority, three variables that it uses for performing the positive feedback credit-based Ethernet link flow control method described herein: (1) the "credit limit" described below, such as with respect to block 302; (2) the "credit count" described below, such as with respect to block 304; and (3) the "Y" value described below with respect to block 708. Additionally, the transmitter portion of each node 102 maintains a response timer that keeps track of the amount of time elapsed since the transmitter sent the most recent absolute credit request 500 (described below with respect to FIG. 5) without receiving an absolute credit response 600/900 (described below with respect to FIGS. 6 and 9).

Figure 2:
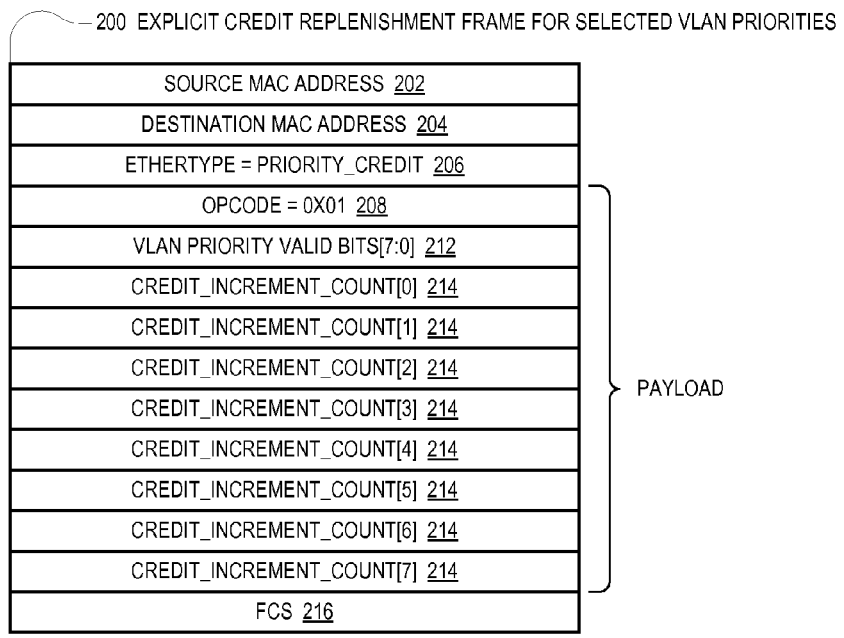
FIG. 2 is a block diagram illustrating an explicit credit replenishment Ethernet frame for selected VLAN priorities used to incrementally replenish credit for one or more specified VLAN priorities.

Referring now to FIG. 2, a block diagram illustrating an explicit credit replenishment Ethernet frame for selected VLAN priorities 200 used to incrementally replenish credit for one or more specified VLAN priorities is shown. The Ethernet frame 200 includes a source MAC address field 202, destination MAC address field 204, an EtherType field 206, an opcode field 208, eight VLAN priority bits 212, eight credit_increment_count fields 214 corresponding to the eight VLAN priorities specified in the eight VLAN priority bits 212, and a frame check sequence (FCS) 216. The source MAC address field 202, destination MAC address field 204 and FCS 216 are as specified in conventional Ethernet frames. The FCS 216 is the 32-bit cyclic redundancy check (CRC) of the frame 200 used for detection of data corruption within the frame 200.

The EtherType field 206 is a 2-byte field located after the source and destination MAC addresses 202/204 as in a conventional Ethernet frame. However, the EtherType field 206 of the explicit credit replenishment Ethernet frame for selected VLAN priorities 200 is populated by the sending Ethernet node 102 with a unique value to distinguish it from other types of Ethernet frames. The unique value is referred to herein as the PRIORITY_CREDIT value, as shown in FIG. 2. That is, the PRIORITY_CREDIT value is a predetermined value that is distinct from other known EtherType values to distinguish it from other protocols encapsulated in the payload of the Ethernet frame. Preferably, the PRIORITY_CREDIT value will be recorded in the IEEE list of EtherType values and is distinct from other values therein. The remainder of the Ethernet frame 200 comprises the payload of the frame 200, namely the opcode field 208, the priority valid bits 212 and the eight credit_increment_count fields 214.

The opcode field 208 is a single byte and is used to distinguish the different credit messages associated with the PRIORITY_CREDIT EtherType value that may be sent and received by an Ethernet node 102 according to the positive feedback credit-based Ethernet link flow control method described herein. In one embodiment, five different credit messages may be sent and received, which are described with respect to FIGS. 2, 5 and 7-9. In one embodiment, a value of 0x01 is used to identify the explicit credit replenishment frame 200 from the other credit messages of FIGS. 5 and 7-9, which are described in more detail below. In one embodiment, the explicit credit replenishment frame 200 includes pad bytes to pad it to the minimum Ethernet frame length.

The eight VLAN priority bits 212 include one bit per VLAN priority. Preferably, if a VLAN priority bit 212 is set to one, then the value in the corresponding credit_increment_count field 214 is valid; otherwise, the value in the corresponding credit_increment_count field 214 is not valid, that is, the frame 200 is not notifying the receiving Ethernet node 102 to update its credit count for the corresponding VLAN priority (described below, such as with respect to block 304).

The credit_increment_count field 214 specifies the number of additional frame transmission credits that the receiving Ethernet node 102 is being replenished by the sending Ethernet node 102 for the corresponding VLAN priority. An embodiment for replenishing the credits is described below with respect to FIG. 3. Preferably, each of the credit_increment_count fields 214 is 24 bits. Although not shown in FIG. 2, preferably the explicit credit replenishment Ethernet frame for selected VLAN priorities 200 also includes a VLAN tag similar to the VLAN tag 850/950 of FIG. 8/9. This embodiment is preferred in networks that require a VLAN tag and which will drop a frame if it does not contain the VLAN tag. It should be noted that although the frame 200 may contain a VLAN tag, preferably the credit_increment_count fields 214 are associated with the VLAN priority valid bits 212 rather than with the VLAN priority indicated in the PCP field of the VLAN tag.

Figure 3:
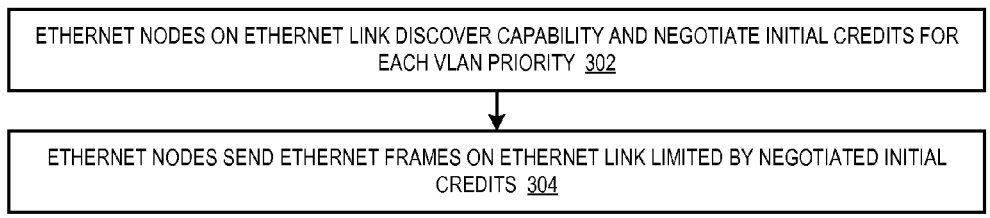
FIGS. 3, 4 and 7 are flowcharts illustrating operation of the pair of Ethernet nodes of FIG. 1.

Referring now to FIG. 3, a flowchart illustrating operation of the pair of Ethernet nodes 102 of FIG. 1 is shown. Flow begins at block 302.

At block 302, the Ethernet nodes 102 on the Ethernet link 112 of FIG. 1 discover one another and determine that they both support the positive feedback credit-based Ethernet link flow control capability. Next, the Ethernet nodes 102 negotiate with one another to establish the initial credits for each Ethernet node 102 for each VLAN priority. In one embodiment, establishing the initial credits includes establishing a "credit limit" for each Ethernet node 102 for each VLAN priority. The credit limit for a priority is the number of frame quanta the Ethernet node 102 has allocated to receive frames of the priority on the Ethernet link 112. One frame quantum is associated with one credit. In one embodiment, the frame quantum is 64 bytes, which is the minimum Ethernet frame size, although other embodiments are contemplated. To illustrate by example, assume the negotiated initial credit for one of the Ethernet nodes 102 is 100 and the frame quantum is 64. This indicates the Ethernet node 102 can receive 64,000 bytes, after which the remote Ethernet node 102 must stop transmitting until at least some of its credits are replenished. In one embodiment, the Ethernet nodes 102 negotiate the frame quantum value, which may accommodate other physical layer/link layer signaling protocols and/or variations developed in the future. The two Ethernet nodes 102 are not required to have the same credit limit, that is, the near node 102 and remote node 102 may have different credit limits, e.g., one Ethernet node 102 may have a credit limit of 200,000 frame quanta and the other Ethernet node 102 may have a credit limit of 250,000 frame quanta. In one embodiment, the Ethernet nodes 102 employ the DCBX APP TLV process to perform the action of block 302, although other embodiments are contemplated. Preferably, if one or both of the Ethernet nodes 102 on the link 112 do not support the positive feedback credit-based Ethernet link flow control capability, then they fall back to using the negative feedback PAUSE or PPP/PFC mechanism. Flow proceeds to block 304.

At block 304, the Ethernet nodes 102 send one another Ethernet frames on the Ethernet link 112 limited by the initial credits for which they negotiated at block 302. In one embodiment, each node 102 maintains a "credit count" value for each VLAN priority. Initially, e.g., after performing the action at block 302, the credit count value for each priority is zero. Each time a node 102 sends an Ethernet frame of a priority on the link 112, it increments its credit count for the priority by the number of credits consumed by the frame. Preferably, the number of credits consumed by the frame is the rounded up quotient of the frame size divided by the frame quantum. For example, if the frame quantum is 64 bytes and the node 102 sends an Ethernet frame of priority 5 that is 200 bytes, then the credits consumed is 4 (roundup(200/64)=4), and the node 102 increments by 4 the credit count for priority 5. For another example, if the frame quantum is 64 bytes and the node 102 sends an Ethernet frame that is 192 bytes, then the credits consumed is 3 (roundup(192/64)=3), and the node 102 increments its credit count by 3. Conversely, each time a node 102 receives a credit replenishment message (e.g., via an explicit credit replenishment frame 200 of FIG. 2 or via a piggy-backed credit replenishment header 800 of FIG. 8), the node 102 decrements its credit count for the specified priority or priorities by the number of credits specified in the credit replenishment message (e.g., in the credit_increment_count field 214 or 814). The node 102 is only allowed to send an Ethernet frame on the link for a priority as long as the number of credits that will be consumed by the transmission of the frame is less than or equal to the difference between the credit limit and the credit count for the priority. For example, if the credit limit is 100,000 and the credit count is currently 99,981 for priority 3, then the node 102 may only send a priority 3 frame whose size is less than or equal to 19 frame quanta (e.g., 19×64=1216 bytes). Flow ends at block 304.

Figure 4:
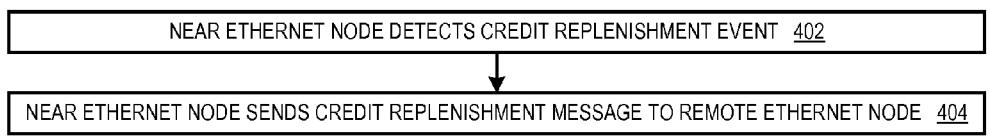

Referring now to FIG. 4, a flowchart illustrating operation of the pair of Ethernet nodes 102 of FIG. 1 is shown. Flow begins at block 402.

At block 402, the near Ethernet node 102 detects a credit replenishment event. A credit replenishment event is an event that causes the near Ethernet node 102 to send a credit replenishment message 200/800 to the remote Ethernet node 102. Preferably, the most common credit replenishment event occurs when the near Ethernet node 102 processes one or more frames (and frees the associated buffers in the case of a device that uses frame buffers) for receiving more Ethernet frames. Flow proceeds to block 404.

At block 404, in response to detecting the credit replenishment event at block 402, the near Ethernet node 102 sends a credit replenishment message 200/800 to the remote Ethernet node 102. Preferably, the credit replenishment message is either an explicit credit replenishment frame 200 of FIG. 2 or is a piggy-backed replenishment header 800 of FIG. 8, which is described in more detail below. When the remote Ethernet node 102 receives the credit replenishment message 200/800, it updates its link frame credit, such as described above with respect to FIG. 3. Flow ends at block 404.

Figure 5:
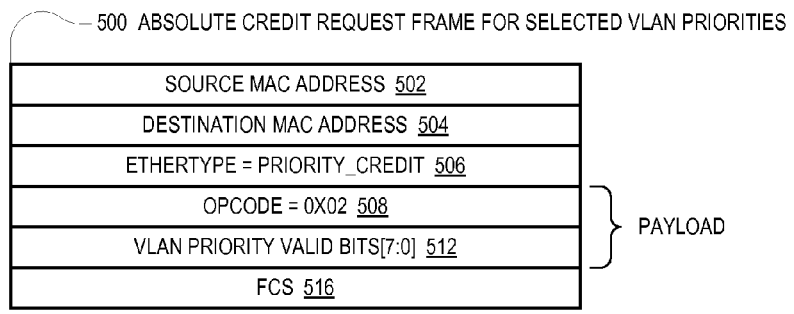
FIG. 5 is a block diagram illustrating an absolute credit request Ethernet frame for selected VLAN priorities used to request absolute credit for one or more specified VLAN priorities.

Referring now to FIG. 5, a block diagram illustrating an absolute credit request Ethernet frame for selected VLAN priorities 500 used to request absolute credit for one or more specified VLAN priorities is shown. The credit request frame 500 includes a source MAC address field 502, destination MAC address field 504, an EtherType field 506, an opcode field 508, eight VLAN priority bits 512, and a frame check sequence (FCS) 516, which are similar to the corresponding fields of the explicit credit replenishment frame 200 described above with respect to FIG. 2. However, the opcode field 508 of the credit request frame 500 has a different value, preferably 0x02, from the opcode field 208 value of the credit replenishment frame 200 of FIG. 2. An Ethernet node 102 sends an absolute credit request frame 500 in order to request absolute credit information from the remote node 102 for each of the VLAN priorities whose corresponding VLAN priority bit 512 is set to a one, as described in more detail below with respect to FIG. 7. Although not shown in FIG. 5, preferably the absolute credit request Ethernet frame for selected VLAN priorities 500 also includes a VLAN tag similar to the VLAN tag 850/950 of FIG. 8/9. This embodiment is preferred in networks that require a VLAN tag and which will drop a frame if it does not contain the VLAN tag.

Figure 6:
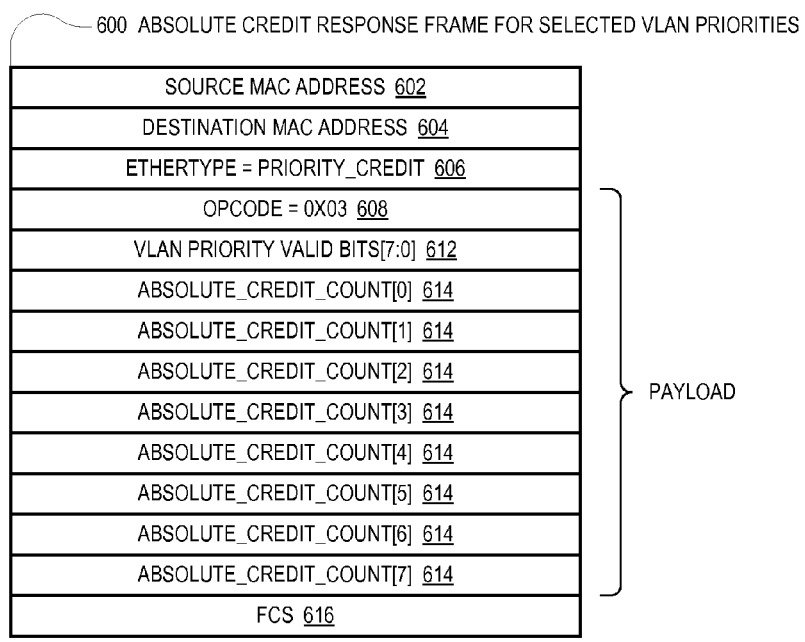
FIG. 6 is a block diagram illustrating an absolute credit response Ethernet frame for selected VLAN priorities used to provide absolute credit information for one or more specified VLAN priorities.

Referring now to FIG. 6, a block diagram illustrating an absolute credit response Ethernet frame for selected VLAN priorities 600 used to provide absolute credit information for one or more specified VLAN priorities is shown. The credit response frame 600 includes a source MAC address field 602, destination MAC address field 604, an EtherType field 606, an opcode field 608, eight VLAN priority bits 612, eight absolute_credit_count fields 614 and a frame check sequence (FCS) 616, which are similar to the corresponding fields of the explicit credit replenishment frame 200 described above with respect to FIG. 2. However, the opcode field 608 of the credit response frame 600 has a different value, preferably 0x03, from the opcode field 208 value of the credit replenishment frame 200 of FIG. 2 and from the absolute credit request frame 500 of FIG. 5. An Ethernet node 102 sends an absolute credit response frame 600 in response to an absolute credit request frame 500 received from the remote node 102, as described in more detail below with respect to FIG. 7. Additionally, the near Ethernet node 102 may send an absolute credit response frame 600 in response to detecting a receiver absolute credit event, such as, but not limited to: (1) detecting that a frame received on the link 112 has an error; (2) detecting that the availability of frame buffers to receive frames from the remote Ethernet node 102 has dropped below a low water mark. When sending a credit response frame 600 in response to a credit request frame 500, the sending Ethernet node 102 sets/clears the VLAN priority bits 612 to match the values received in the VLAN priority bits 512 in the received credit request frame 500. However, when sending a credit response frame 600 in response to a receiver absolute credit event, the sending Ethernet node 102 sets the VLAN priority bits 612 as needed.

The credit response frame 600 also includes the eight absolute_credit_count fields 614 corresponding to the eight VLAN priorities specified in the eight VLAN priority bits 612. For each VLAN priority bit 612 set to one, the absolute_credit_count field 614 specifies a number of frame transmission credits used to re-establish the credit counts for the receiving Ethernet node 102 for the corresponding VLAN priority. Re-establishing the credit counts is described in more detail below with respect to FIG. 7. Preferably, each of the credit_increment_count fields 614 is 24 bits. Although not shown in FIG. 6, preferably the absolute credit response Ethernet frame for selected VLAN priorities 600 also includes a VLAN tag similar to the VLAN tag 850/950 of FIG. 8/9. This embodiment is preferred in networks that require a VLAN tag and which will drop a frame if it does not contain the VLAN tag. It should be noted that although the frame 600 may contain a VLAN tag, preferably the absolute_credit_count fields 614 are associated with the VLAN priority valid bits 612 rather than with the VLAN priority indicated in the PCP field of the VLAN tag.

Figure 7:
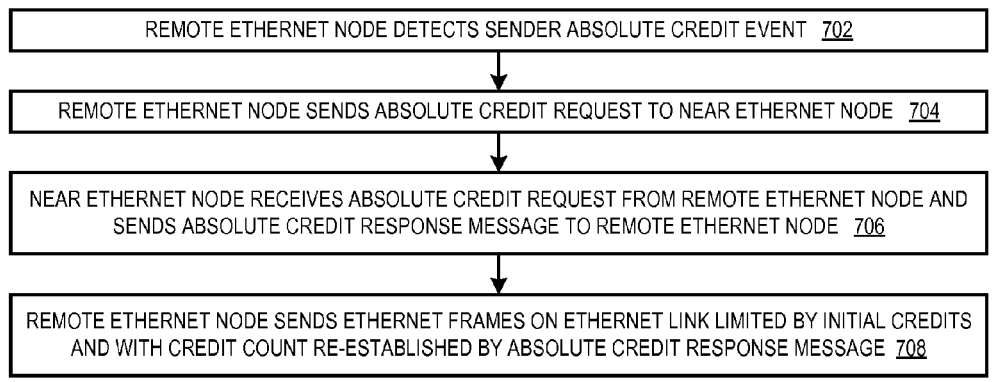

Referring now to FIG. 7, a flowchart illustrating operation of the pair of Ethernet nodes 102 of FIG. 1 is shown. Flow begins at block 702.

At block 702, the remote Ethernet node 102 detects a sender absolute credit event. In one embodiment, the sender absolute credit events include, but are not limited to the following. First, the remote Ethernet node 102 detects that an Ethernet frame it has received on the link 112 from the near Ethernet node 102 has an error, such as an FCS error. A received frame error may be an indication that something is wrong with the link 112 such that frames that include credit information being sent by the near Ethernet node 102 to the remote Ethernet node 102, such as credit replenishment frames 200, may also have errors and have been dropped by the remote Ethernet node 102. In this case, the remote Ethernet node 102 typically requests absolute credit for all the VLAN priorities. Second, the remote Ethernet node 102 detects that the number of frame buffers available to receive frames from the near Ethernet node 102 for one or more VLAN priorities has dropped below a low water mark. Third, the remote Ethernet node 102 detects that a predetermined time interval has passed since it last received a credit replenishment message 200/800 from the near Ethernet node 102 for one or more VLAN priorities. Fourth, the remote Ethernet node 102 detects that a predetermined time interval has passed since it last received an absolute credit response message (an absolute credit response frame 600 or a piggy-backed absolute credit response header 900 of FIG. 9) from the near Ethernet node 102 for one or more VLAN priorities. Fifth, the remote Ethernet node 102 detects the amount of time elapsed on the response timer has exceeded a predetermined threshold, that is, no absolute credit response has been received within the predetermined threshold of time. Flow proceeds to block 704.

At block 704, the remote Ethernet node 102 sends an absolute credit request frame 500 of FIG. 5 to the near Ethernet node 102 in response to detecting the sender absolute credit event at block 702. Additionally, the remote Ethernet node 102 starts the response timer described above with respect to FIG. 1. Preferably, if the response timer is already running, the remote Ethernet node 102 restarts the response timer. Flow proceeds to block 706.

Figure 9:
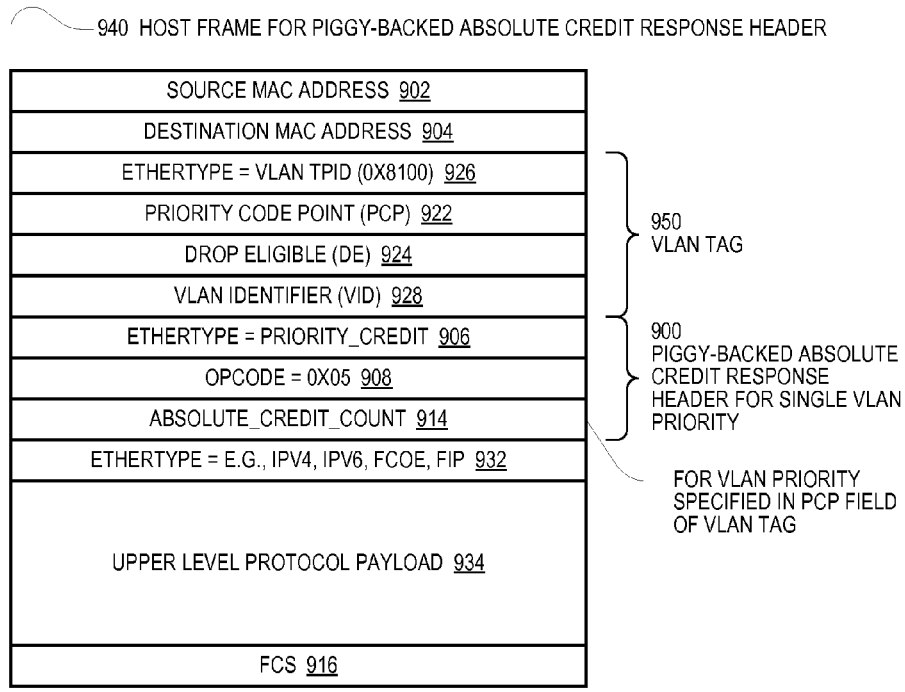
FIG. 9 is a block diagram illustrating an absolute credit response header for a single VLAN priority that is piggy-backed on a host Ethernet frame.

At block 706, the near Ethernet node 102 receives the absolute credit request frame 500 sent at block 704 and, in response, sends an absolute credit response message 600/900 to the remote Ethernet node 102, that is, an absolute credit response frame 600 of FIG. 6 or a piggy-backed absolute credit response header 900 of FIG. 9. For each requested VLAN priority, the near Ethernet node 102 populates the corresponding absolute_credit_count field 614 (or absolute_credit_count field 914 described below with respect to FIG. 9) with a value that is the number of frame quanta of frames the near Ethernet node 102 is able to receive of the corresponding VLAN priority on the Ethernet link 112 from the remote Ethernet node 102. Preferably, the value is the number of frame quanta at the time the absolute credit request 500 is received rather than at the time the near Ethernet node 102 sends the absolute credit response. This recognizes that the near Ethernet node 102 may receive additional frames from the remote Ethernet node 102 in between the time the absolute credit request 500 is received and the time the absolute credit response is sent. Furthermore, preferably the value is the number of frame quanta at the time the first absolute credit request 500 is received if additional absolute credit requests 500 are received before the near Ethernet node 102 sends the absolute credit response. As discussed above with respect to FIG. 6, the near Ethernet node 102 may also send an absolute credit response frame 600 (or piggy-backed absolute credit response header 900 of FIG. 9) to the remote Ethernet node 102 in response to detecting a receiver absolute credit event. Flow proceeds to block 708.

At block 708, the remote Ethernet node 102 sends Ethernet frames on the Ethernet link 112 to the near Ethernet node 102 limited by the initial credits for which they negotiated at block 302 and with the credit count re-established by the received absolute credit response message 600/900 that was sent at block 706. The remote Ethernet node 102 re-establishes it credit count (the credit count is described above with respect to FIG. 3) for the VLAN priority based on the value specified in the corresponding absolute_credit_count field 614/914. In one embodiment, the remote Ethernet node 102 resets it credit count for the VLAN priority to the value specified in the corresponding absolute_credit_count field 614/914. In another embodiment, if the value of the absolute_credit_count field 614/914 in the received response message 600/900 value is zero, then the remote Ethernet node 102 updates its credit count with the value zero; otherwise, the remote Ethernet node 102 updates its credit count with the difference of X minus Y, where X is the value of the absolute_credit_count field 614/914 in the received response message 600/900, and Y is the value of a counter maintained for each VLAN priority. The counter counts the number of credits for the VLAN priority used by the remote node 102 after sending one or more credit request message 500. The counter is reset to zero each time the remote node 102 receives from the near node 102 at block 706 a credit response message 600/900 that specifies the VLAN priority. Flow ends at block 708.

Figure 8:
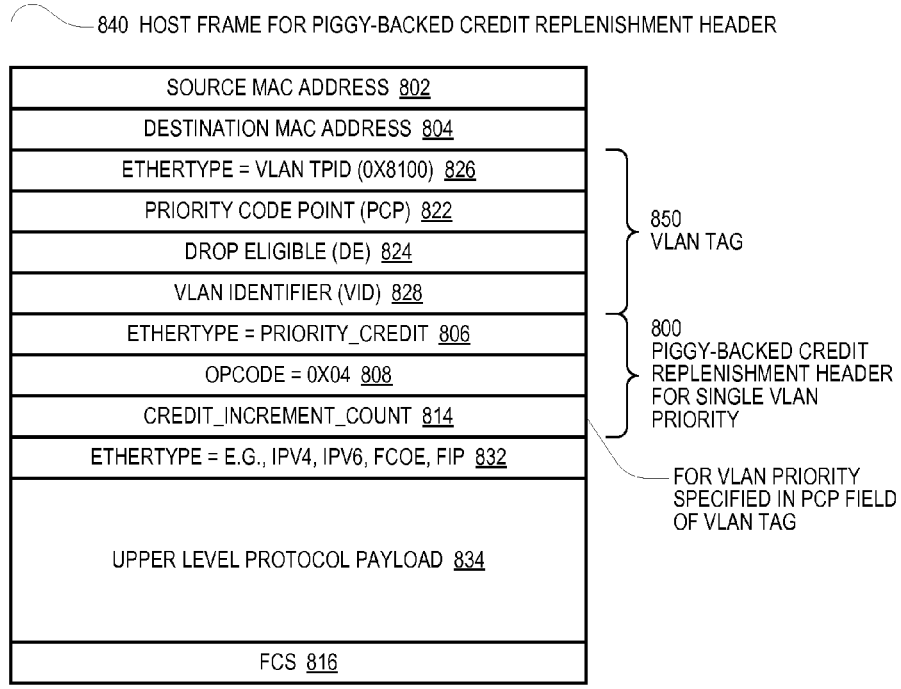
FIG. 8 is a block diagram illustrating a credit replenishment header for a single VLAN priority that is piggy-backed on a host Ethernet frame.

Referring now to FIG. 8, a block diagram illustrating a credit replenishment header 800 for a single VLAN priority that is piggy-backed on a host Ethernet frame 840 is shown. The host frame 840 includes a source MAC address field 802, destination MAC address field 804, a VLAN tag 850, a piggy-backed credit replenishment header 800, an EtherType field 832, an upper level protocol payload 834 and a frame check sequence (FCS) 816. The source MAC address field 802, destination MAC address field 804 and FCS 816 fields are similar to the corresponding fields of the explicit credit replenishment frame 200 described above with respect to FIG. 2. The host frame 840 may be any Ethernet frame that includes a VLAN tag 850 that specifies a VLAN priority (specified in the PCP field 822 described below) and will typically be part of the data traffic between the two linked Ethernet nodes 102. Thus, the EtherType field 832 of the host frame 840 has a value that specifies an upper level protocol, such as, but not limited to, Internet Protocol version 4 (IPv4), Internet Protocol version 6 (IPv6), FCoE, FCoE Initialization Protocol (FIP), Internet Control Message Protocol (ICMP), Explicit Congestion Notification (ECN), Internet Group Management Protocol (IGMP) and Internet Protocol Security (IPsec). The payload 834 includes the data associated with the upper layer protocol specified in the EtherType field 832. Of course, the payload 834 may encapsulate other upper level protocols such as the Transmission Control Protocol (TCP) or other transport layer protocols and application layer protocols such as Dynamic Host Configuration Protocol (DHCP), File Transfer Protocol (FTP), Hypertext Transfer Protocol (HTTP), Internet Message Access Protocol (IMAP), Domain Name System (DNS) and Simple Mail Transfer Protocol (SMTP) among others.

The VLAN tag 850 is a conventional VLAN tag, also referred to as an IEEE 802.1Q tag or VLAN header, which includes a second EtherType field 826 that is distinct from the EtherType field 832 that specifies the upper level protocol. The Ethertype field 826 of the VLAN tag 850, which is also referred to as the Tag Protocol Identifier (TPID), has a well-known value of 0x8100. The VLAN tag 850 also includes a priority code point (PCP) field 822, which is a 3-bit field, that specifies the VLAN priority associated with the host frame 840, which may be one of eight different values, zero through seven. The VLAN tag 850 also includes a drop eligible (DE) bit 824 and a 12-bit VLAN Identifier (VID) field 828 that specifies the VLAN to which the host frame 840 belongs.

The credit replenishment header 800 includes a third EtherType field 806 that is distinct from the EtherType field 832 that specifies the upper level protocol and from the Ethertype field 826 of the VLAN tag 850. The credit replenishment header 800 EtherType field 806 has the PRIORITY_CREDIT value described above to distinguish the header 800 as having credit information for use in the positive feedback credit-based Ethernet link flow control mechanism. The opcode field 808 of the credit replenishment header 800 has a different value, preferably 0x04, from the opcode field 208/508/608 values of the credit replenishment, credit request and credit response frames 200/500/600 of FIGS. 2, 5 and 6.

The credit replenishment header 800 also includes a credit_increment_count field 814 that specifies the number of additional frame transmission credits that the receiving Ethernet node 102 is being replenished by the sending Ethernet node 102 for the VLAN priority specified in the PCP field 822 of the VLAN tag 850. An embodiment for replenishing the credits is described above with respect to FIG. 3. Preferably, the credit_increment_count field 814 is 24 bits. Thus, the credit replenishment header 800 may be used advantageously to incrementally replenish credit for a single VLAN priority specified in the VLAN tag 850 of the host frame 840.

In some cases the receiving Ethernet node 102 will be able to replenish the transmitting Ethernet node's 102 link flow control credit, as described with respect to block 404 of FIG. 4 for example, by piggy-backing a credit replenishment header 800 on a host frame 840 having the desired VLAN priority that is being sent to the transmitting Ethernet node 102 during the flow of traffic, rather than sending an explicit credit replenishment frame 200. Advantageously, the credit replenishment header 800 adds only six bytes to the size of the host frame 840. In some cases the host frame 840 may even have Ethernet frame padding bytes that may be reduced or eliminated completely because the credit replenishment header 800 contributes toward meeting the minimum Ethernet frame size of 64 bytes. Piggy-backing the credit replenishment header 800 on the host frame 840 may be beneficial because it may consume less bandwidth on the link 112 because it is smaller than the explicit credit replenishment frame 200. However, in some cases the rate at which the receiving node 102 is sending frames for a given VLAN priority may be so much slower than the rate at which the transmitting node 102 is sending frames of the VLAN priority that the receiving node 102 is unable to replenish the transmitting node's 102 credit quickly enough using only piggy-backed replenishment headers 800 and must therefore use some explicit replenishment frames 200. To illustrate by way of example, assume the transmitting node 102 negotiated for a credit of 32 for a given VLAN priority, and assume the transmitting node 102 is transmitting at a rate that is 64 times the rate at which the receiving node 102 is transmitting for the VLAN priority. In this case, the receiving node will need to send approximately one explicit replenishment frame 200 for every piggy-backed replenishment header 800 for the VLAN priority.

Referring now to FIG. 9, a block diagram illustrating an absolute credit response header 900 for a single VLAN priority that is piggy-backed on a host Ethernet frame 940 is shown. The host frame 940 includes a source MAC address field 902, destination MAC address field 904, a VLAN tag 950, a piggy-backed absolute credit response header 900, an EtherType field 932, an upper level protocol payload 934 and a frame check sequence (FCS) 916 that are similar to the corresponding fields of the host frame 840 described above with respect to FIG. 8. However, the absolute credit response header 900 has an opcode field 908 that has a different value, preferably 0x05, from the opcode field 208/508/608/808 values of the credit replenishment frame 200, credit request frame 500, credit response frame 600 and credit replenishment header 800 of FIGS. 2, 5, 6 and 8. Furthermore, the absolute credit response header 900 includes an absolute_credit_count field 914 that specifies a number of frame transmission credits used to re-establish the credit counts for the receiving Ethernet node 102 for the VLAN priority specified in the PCP field 922 of the VLAN tag 950. Re-establishing the credit counts is described in more detail above with respect to FIG. 7. Preferably, the credit_increment_count field 914 is 24 bits. Thus, the absolute credit response header 900 may be used advantageously to re-establish the credit counts for a single VLAN priority specified in the VLAN tag 950 of the host frame 940.

In some cases the receiving Ethernet node 102 will be able to re-establish the credit counts of the transmitting Ethernet node 102, as described with respect to FIG. 7 for example, by piggy-backing an absolute credit response header 900 on a host frame 940 having the desired VLAN priority that is being sent to the transmitting Ethernet node 102 during the flow of traffic, rather than sending an explicit absolute credit response frame 600, which has similar size advantages to the credit replenishment header 800 as discussed above.

As may be observed from the above, the link credit messages of FIGS. 2, 5 and 6 (identified by opcode values 0x01, 0x02 and 0x03) are explicit Ethernet frames 200/500/600, whereas the link credit messages 800/900 (identified by opcode values of 0x04 and 0x05) are included within a short header that is piggy-backed on top of a host Ethernet frame 840/940 that includes a VLAN tag 850/950 specifying a VLAN priority. The piggy-backing of the headers 800/900 onto another Ethernet frame 840/940 may be performed in a manner similar to the manner in which MPLS, QinQ tag, VLAN tag and VN tag headers are piggy-backed onto Ethernet frames.

Although embodiments in which a particular credit management scheme have been described using credit limit and credit count values and the manner in which they are established, incremented and decremented, other embodiments are contemplated and may be employed to accomplish the positive feedback credit-based Ethernet link flow control mechanism. For example, alternatively, the credit count value is initially set to the credit limit; each time the node sends a frame the credit count is decremented; the credit count value is incremented by a credit replenishment message; and the node is only allowed to send a frame if the frame will consume less credits than the credit count.

Although embodiments have been described in which the credit information for the positive feedback credit-based Ethernet link flow control capability is transferred either in the payload of an explicit Ethernet frame or in a header piggy-backed on a host Ethernet frame, other embodiments are contemplated in which the credit information is not sent in Ethernet frames but is instead sent in a 4-byte ordered set, similar to the manner in which Fibre Channel Receiver Ready (R_RDY) ordered sets are sent.

Embodiments described herein include the following potential advantages. First, the transmission of Ethernet frames between two Ethernet nodes on an Ethernet link may be lossless, at least with respect to frame buffer overflow. Advantageously, the lossless behavior may be selective for specified VLAN priorities within which upper level protocols are operating that require lossless behavior (e.g., FCoE). Second, the timeouts and frame retransmissions associated with the conventional PAUSE or PPP/PFC frame solution may be reduced or eliminated, thereby providing improved performance, for example in terms of increased server CPU and Ethernet link utilization and avoidance of high I/O latency caused by the timeouts and retransmissions experienced by the conventional approach.

While various embodiments have been described herein, it should be understood that they have been presented by way of example, and not limitation. It will be apparent to persons skilled in the relevant computer arts that various changes in form and detail can be made therein without departing from the scope of the invention. For example, software can enable the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known non-transitory computer usable medium such as magnetic tape, semiconductor, magnetic disk, or optical disc (e.g., CD-ROM, DVD-ROM, etc.), a network, or wire line, or other communications medium. Embodiments of the apparatus and method described herein may be included in an integrated circuit. Additionally, the apparatus and methods described herein may be embodied as a combination of hardware and software. Thus, the present invention should not be limited by any of the exemplary embodiments described herein, but should be defined only in accordance with the following claims and their equivalents. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:
1. An Ethernet node, comprising:
 a receiver for coupling to an Ethernet link for receiving Ethernet frames from a remote Ethernet node at a remote end of the Ethernet link; and a transmitter for coupling to the Ethernet link for sending Ethernet frames to the remote Ethernet node on the Ethernet link;

wherein:

the Ethernet node is configured to send to the remote Ethernet node credit information that enables the remote Ethernet node to know an amount of Ethernet frames the remote Ethernet node is allowed to send to the Ethernet node;

the credit information is included in a header piggybacked on a host Ethernet frame that includes a payload for an upper layer protocol above an Ethernet data link layer protocol;

the header includes an EtherType field that specifies a predetermined value to indicate the header includes the credit information;

the predetermined value of the EtherType field is distinct from a value in a succeeding EtherType field of the host Ethernet frame that is not within the header; and the value in the succeeding EtherType field specifies the upper layer protocol.

2. The Ethernet node of claim 1, wherein the credit information specifies a virtual local area network (VLAN) priority;

wherein the credit information enables the remote Ethernet node to know the amount of Ethernet frames having the specified VLAN priority the remote Ethernet node is allowed to send to the Ethernet node.

3. The Ethernet node of claim 1, wherein the credit information specifies a plurality of virtual local area network (VLAN) priorities;

wherein for each VLAN priority of the plurality of VLAN priorities, the credit information enables the remote Ethernet node to know the amount of Ethernet frames having the VLAN priority the remote Ethernet node is allowed to send to the Ethernet node.

4. The Ethernet node of claim 1, wherein the credit information instructs the remote Ethernet node to increase a credit count by a number of frame quanta indicated in the credit information.

5. The Ethernet node of claim 1, wherein the credit information instructs the remote Ethernet node to re-establish a credit count based on a number of frame quanta indicated in the credit information.

6. The Ethernet node of claim 5, wherein the Ethernet node is configured to send the credit information in response to a request for the credit information by the remote Ethernet node.

7. The Ethernet node of claim 1, wherein the host Ethernet frame includes a virtual local area network (VLAN) priority tag that specifies a VLAN priority, wherein the credit information enables the remote Ethernet node to know the amount of Ethernet frames having the specified VLAN priority the remote Ethernet node is allowed to send to the Ethernet node.

8. The Ethernet node of claim 1, wherein the Ethernet node is configured to send the credit information in response to the Ethernet node processing Ethernet frames received from the remote Ethernet node.

9. The Ethernet node of claim 1, wherein the Ethernet node is configured to receive from the remote Ethernet node second credit information that enables the Ethernet node to know an amount of Ethernet frames the Ethernet node is allowed to send to the remote Ethernet node.

10. A method for controlling the flow of Ethernet frames on an Ethernet link that couples first and second Ethernet nodes, the method comprising:

sending, by the first Ethernet node, to the second Ethernet node first credit information that enables the second Ethernet node to know a first amount of Ethernet frames the second Ethernet node is allowed to send to the first Ethernet node; and receiving, by the first Ethernet node, from the second Ethernet node second credit information that enables the first Ethernet node to know a second amount of Ethernet frames the first Ethernet node is allowed to send to the second Ethernet node;

wherein:

the first credit information is included in a header piggybacked on a host Ethernet frame that includes a payload for an upper layer protocol above an Ethernet data link layer protocol;

the header includes an EtherType field that specifies a predetermined value to indicate the header includes the credit information;

the predetermined value of the EtherType field is distinct from a value in a succeeding EtherType field of the host Ethernet frame that is not within the header; and the value in the succeeding EtherType field specifies the upper layer protocol.

11. The method of claim 10, wherein the first credit information specifies a first virtual local area network (VLAN) priority, wherein the second credit information specifies a second VLAN priority;

wherein the first credit information enables the second Ethernet node to know the first amount of Ethernet frames having the specified first VLAN priority the second Ethernet node is allowed to send to the first Ethernet node;

wherein the second credit information enables the first Ethernet node to know the second amount of Ethernet frames having the specified second VLAN priority the first Ethernet node is allowed to send to the second Ethernet node.

12. The method of claim 10, further comprising:

increasing, by the second Ethernet node, a first credit count by a number of frame quanta indicated in the first credit information; and increasing, by the first Ethernet node, a second credit count by a number of frame quanta indicated in the second credit information.

13. The method of claim 10, further comprising:

sending, by the first Ethernet node, the first credit information in response to the first Ethernet node processing Ethernet frames received from the second Ethernet node; and sending, by the second Ethernet node, the second credit information in response to the second Ethernet node processing Ethernet frames received from the first Ethernet node.

14. The method of claim 10, further comprising: sending, by the first Ethernet node, the first credit information in response to detecting an error in an Ethernet frame received on the link by the first Ethernet node.

* * * * *